United States Patent [19]
Clarke et al.

[11] Patent Number: 6,089,279
[45] Date of Patent: Jul. 18, 2000

[54] PIPE, A METHOD OF CONSTRUCTING THE PIPE AND A METHOD OF LINING OR RE-LINING A SEWER USING THE PIPE AS A LINER

[75] Inventors: Graham Clarke, West Midlands; Ronald C. Harris, Shropshire, both of United Kingdom

[73] Assignee: Johnston Pipes Limited, Shropshire, United Kingdom

[21] Appl. No.: 08/848,415

[22] Filed: May 8, 1997

[30] Foreign Application Priority Data

May 8, 1996 [GB] United Kingdom .................. 9609527

[51] Int. Cl.[7] ...................................................... F16L 9/00
[52] U.S. Cl. ................................................................ 138/157
[58] Field of Search ............................... 52/546; 228/170; 285/369, 419, 373; 138/149, 99, 157, 155, 120, 109; 405/270, 129

[56] References Cited

U.S. PATENT DOCUMENTS

| | | | |
|---|---|---|---|
| 1,016,581 | 2/1912 | Schlafly | 138/158 |
| 1,905,794 | 4/1933 | Burke | 138/158 |
| 3,058,494 | 10/1962 | Mohr et al. | 138/158 |
| 3,798,914 | 3/1974 | Irwin-Childs | 61/35 |
| 4,437,691 | 3/1984 | Laney | 285/353 |
| 4,916,937 | 4/1990 | Robertson et al. | 405/270 |
| 5,054,824 | 10/1991 | Wyss | 285/369 |
| 5,186,217 | 2/1993 | Kallinich et al. | 138/149 |
| 5,393,107 | 2/1995 | Vobeck | 285/322 |
| 5,527,130 | 6/1996 | Webb | 405/52 |
| 5,732,743 | 3/1998 | Livesay | 138/99 |
| 5,765,965 | 6/1998 | Carter, Jr. et al. | 405/129 |
| 5,921,591 | 7/1999 | Argent | 285/330 |

FOREIGN PATENT DOCUMENTS

| | | | |
|---|---|---|---|
| 496 475 | 11/1938 | United Kingdom . | |
| 1 034 303 | 6/1966 | United Kingdom | E21D 5/04 |
| 1 124 692 | 8/1968 | United Kingdom | E04G 13/02 |
| 1 232 300 | 5/1971 | United Kingdom | E01G 5/04 |
| 1 286 957 | 8/1972 | United Kingdom | E01G 5/02 |
| 1 587 101 | 4/1978 | United Kingdom | F16L 9/08 |
| 1 564 038 | 4/1980 | United Kingdom | E21D 9/06 |
| 2 055 929 | 3/1981 | United Kingdom | E21D 11/38 |
| 2 087 456 | 5/1982 | United Kingdom | E21D 11/38 |
| 2 094 860 | 9/1982 | United Kingdom | E21D 11/00 |
| 2 186 656 | 8/1987 | United Kingdom | G03F 3/00 |

*Primary Examiner*—Andres Kashnikow
*Assistant Examiner*—Davis Hwu
*Attorney, Agent, or Firm*—Westman, Champlin & Kelly, P.A.

[57] ABSTRACT

The present invention relates to a pipe having a pipe section (10) which comprises two or more panels (11, 12, 13, 14, 15) which extend longitudinally along the pipe section (10). Two or more connecting strips (16) are provided which are integers independent from the two or more panels (11, 12, 13, 14, 15). The connecting strips (16) extend longitudinally along the pipe section (10) and each of the connecting strips (16) connects a first panel (e.g. 11) to a second panel (e.g. 12). Preferably, each panel (11, 12, 13, 14, 15) is formed by cutting a one piece pipe lengthwise.

The present invention also relates to a method of constructing a pipe comprising: manufacturing a pipe with a chosen cross-section; cutting the manufactured pipe lengthwise two or more times to form two or more panels (11, 12, 13, 14, 15); manufacturing the connecting strips (16); transporting the panels (11, 12, 13, 14, 15) and the connecting strips (16) to a site where the pipe is to be constructed; and assembling the pipe by connecting the panels (11, 12, 13, 14, 15) together using the connecting strips (16).

The pipe can be used to line or re-line a sewer.

27 Claims, 2 Drawing Sheets

PIPE, A METHOD OF CONSTRUCTING THE PIPE AND A METHOD OF LINING OR RE-LINING A SEWER USING THE PIPE AS A LINER

The present invention relates to a pipe, a method of constructing the pipe and a method of lining or re-lining a sewer, underground pipe or an underground tunnel using the pipe as a liner.

Many brick built sewers in the United Kingdom through age have fallen into some disrepair and are no longer water-tight. In order to repair the brick-lined sewers sheets of plastic material are commonly used as a liner. Usually grout is inserted between the lining material and the brick wall of the sewer after the liner has been inserted. It will be appreciated that the installation of a liner in a sewer is a difficult job due to space constraints.

In the applicant's earlier patent GB-B-2055929 a method of lining or relining a tunnel is described which comprises the use of a compressible collar joint, a pipe split by a single longitudinal cut and an H-shaped joint. First of all, the collar joint is compressed and then inserted into the sewer to be lined. Once positioned correctly, the collar is allowed to stand and to engage the inner wall of the sewer. Then the pipe is rolled up by overlapping the edges of the pipe which border the longitudinal slit. The pipe is held rolled up by straps. The rolled-up pipe is inserted into the sewer and then the straps are removed to allow the pipe to expand back to its original shape. The longitudinal slit along the pipe is sealed using a longitudinal H-shaped strip. The pipe with its original shape and the longitudinal H-shaped strip are then inserted into the collar. Once the pipe has been inserted into the collar then the gap between the pipe and the inner wall of the sewer will be sealed by grout. Usually the pipe is made of a translucent or transparent material so that the grouting can be observed.

The applicant found that the method of GB-B-2055929 was not suitable in all instances since the requirement for rolling up the sheet lead to a restriction on the thickness and resilience of the sheet material which could be used and thus the resulting formed pipe was prone to buckling and deformation.

In GB-A-2087456 a different method of lining a sewer is described. The preferred method described in the patent shows the use of a pipe as a liner, the pipe comprising two sheets of plastic material each of semicircular transverse cross-section. One of the sheets is provided along its longitudinal edges with integrally formed grooves. The other sheet is provided along its longitudinal edges with integrally formed tongues. The two sheets are separately manoeuvred into a sewer and the sheets then assembled to form the lining by engagement of the longitudinal tongues in the longitudinal grooves. A flexible adhesive is used to ensure a water-tight joint between the grooves and the tunnels. A separate locking ring can be used joining one section of liner (formed from two separate sheets) to a second section of liner (again formed from two separate sheets). The tongues and grooves are offset relative to the lining sheets so that they lie outside the formed pipe in use so that the inner surface of the pipe is smooth. An interlocking arrangement can be formed integrally on the ends of the formed pipe sections to avoid the need for separate locking rings. Once a section of pipe has been assembled then grout will be inserted between the pipe and the wall of the sewer. The lining material used is transparent or translucent to enable the constructor to monitor the grouting operation.

The method of GB-A-2087456 requires the careful manufacture of pipe section panels, because each pipe section panel must include either a tongue or a groove and possibly also an end connector flange. The manufacture of pipe sections panels would normally be carried out by a moulding process, with different moulds used for different length and different shape pieces. Thus the method is not very flexible and is quite costly. Also it is difficult to manufacture panels to close tolerances.

The present invention provides in a first aspect a pipe having a pipe section which comprises two or more panels which extend longitudinally along the pipe section and two or more connecting strips which are integers independent from the panels, which connecting strips extend longitudinally along the pipe section and each of which interconnects two panels.

A pipe according to the invention can be easily transported to the site where it is required since it can be transported in its component parts, the panels and the connecting strips for assembly at site. This is especially important if the pipe is to be used as a liner for an existing sewer, tunnel or the like; in this case the components can be banded together and taken into the sewer to the point of use. If any connecting strip is damaged it can be replaced without disturbing the remaining panels and connecting strips.

Preferably each panel is a panel formed by cutting a one piece pipe lengthwise.

The invention also enables normal manufacturing processes to be used since the panels can be formed by lengthwise cutting of a pipe formed in one piece by a standard manufacturing process such as centrifugal casting. This enables costs to be kept low. This also ensures that there is accuracy of build; for instance the one piece pipe could be made by the centrifugal casting method, which is a machine controlled repeatable process which makes one piece pipes of a high standard. The construction of the pipe of the present invention enables a pipe to be manufactured as a lining for a sewer with a very dense, void free structure which can be engineered to have the required mechanical and chemical properties and can meet British Standards.

Preferably, a first of the panels has a width different to the width of a second of the panels.

Preferably, a first of the panels has a transverse cross-section different to the transverse cross-section of a second of the panels. Preferably the first panel has a curved transverse cross-section with a first radius of curvature and the second panel has a curved transverse cross-section with a second different radius of curvature.

Preferably the pipe section comprises three or more panels joined together by three or more connecting strips.

Preferably the pipe section comprises four or more panels joined together by four or more connecting strips.

Preferably the panels are each formed from glass reinforced plastic.

Preferably each connecting strip is adhered to at least one panel by an adhesive.

The connecting strips can be formed from glass reinforced plastic, or from any plastic, or from a metal.

Preferably, each connecting strip is H-shaped in transverse cross-section, having two flanges joined by a web, and each connecting strip thereby provides two grooves in which longitudinal edges of two separate panels can be located to join the panels together, one of the flanges overlaying edges of the joined panels inside the pipe and the other of the flanges overlaying edges of the joined panels outside the pipe.

Preferably, the pipe is self-supporting.

The present invention also provides a pipe as described above which comprises a two or more pipe sections each comprising two or more panels which extend longitudinally along the pipe section and each comprising two or more connecting strips which extend longitudinally along the pipe section and each of which interconnects two panels.

Preferably adjoining ends of two pipe sections each have recessed portions defined by the shape and configuration of the panels and the connecting strips, which recessed portions together define an annular rebate in the exterior of the pipe, and preferably the two pipe sections are joined by an annular connector which is an integer independent of the two pipe sections and which is dimensioned to be contained completely within the annular recess.

Preferably the annular connector is an annular member formed by transverse cutting of a one piece pipe.

The present invention further provides a method of constructing the pipe described above comprising manufacturing a pipe with a chosen cross-section, cutting the manufactured pipe lengthwise two or more times to form two or more panels, manufacturing the connecting strips, transporting the panels and the connecting strips to a site where the pipe is to be constructed, and assembling the pipe by connecting the panels together using the connecting strips.

Preferably the pipe manufactured with the chosen cross-section is a one piece pipe manufactured by the centrifugal casting method.

The present invention further provides a method of constructing the pipe described above comprising manufacturing two or more pipe sections each with a chosen cross-section, cutting each pipe section lengthwise two or more times to form two or more panels, manufacturing two or more connecting strips, manufacturing the annular connector, transporting the panels, the connecting strips and the annular connector to a site where the pipe is to be constructed, assembling a first pipe section by connecting a first set of the panels together using a first set of the connecting strips, assembling a second pipe section by connecting a second set of the panels together using a second set of the connecting strips, and joining the first pipe section to the second pipe section using the annular connector.

Preferably the pipe sections are manufactured by manufacturing a one piece pipe and then cutting the one piece pipe transversely to form the pipe sections.

Preferably the annular connector is manufactured by manufacturing a one piece pipe and then cutting the one piece pipe transversely to form the annular connector.

The method of the invention advantageously permits the easy manufacture of various lengths of pipe sections in whatever number required in order, for instance, to meet the requirements of lining a sewer. This enables, for instance a quick response to site difficulties requiring a change from the anticipated lining length.

Preferably in the above described methods an adhesive is used to adhere the panels to the connecting strips.

Additionally, the present invention provides a method of lining or re-lining an existing sewer, an existing underground pipe or an existing underground tunnel in which a pipe as described above is used as a liner and in which the panels and the connecting strips are transported underground to the sewer, the underground pipe or the underground tunnel and then the pipe is assembled as a liner for the sewer by connecting the panels together using the connecting strips to form the assembled pipe.

Furthermore the present invention provides a method of lining or re-lining an existing sewer, an existing underground pipe or an existing underground tunnel in which a pipe as described above is used as a liner and in which the panels, the connecting strips and the annular connector are transported underground to the sewer, the pipe or the tunnel and then a first pipe section is assembled by connecting a first set of the panels together using a first set of the connecting strips, a second pipe section is assembled by connecting a second set of the panels together using a second set of the connecting strips and then the first and second pipe sections are joined together using the annular connector to form the assembled pipe.

Preferably each pipe section is assembled by joining the panels together panel by panel using the connecting strips to first form a base and then sides of the pipe section, thereby forming a slot at the top of the pipe for a final uppermost panel, which final uppermost panel is slid longitudinally into the slot to complete the pipe section.

Preferably in the above described methods the dimensions of the assembled pipe are chosen to leave a space defined between the assembled pipe and the surrounding sewer, underground pipe or underground tunnel and the method includes the step of filling the defined space with grout.

A preferred embodiment of the present invention will now be described with reference to the accompanying drawings in which.

Figure 1:
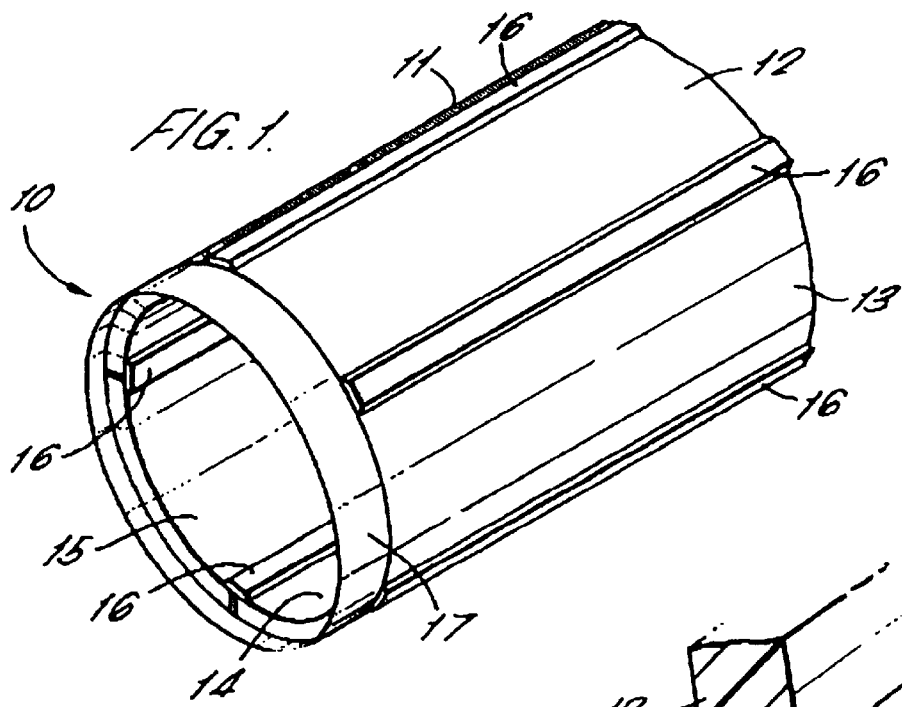
FIG. 1 is a schematic drawing showing an assembled pipe suitable for use as a liner for a sewer.

Turning first to FIG. 1, in the figure there can be seen a pipe section 10 suitable for use as a liner for lining or re-lining a sewer, the pipe section 10 comprising a plurality of panels 11, 12, 13, 14 and 15, each of which run along the whole length of the pipe section. Each panel is joined to two other panels by an H-shaped connecting strip 16 (a total of five H-shaped connecting strips 16 are shown in FIG. 1).

Figure 2:
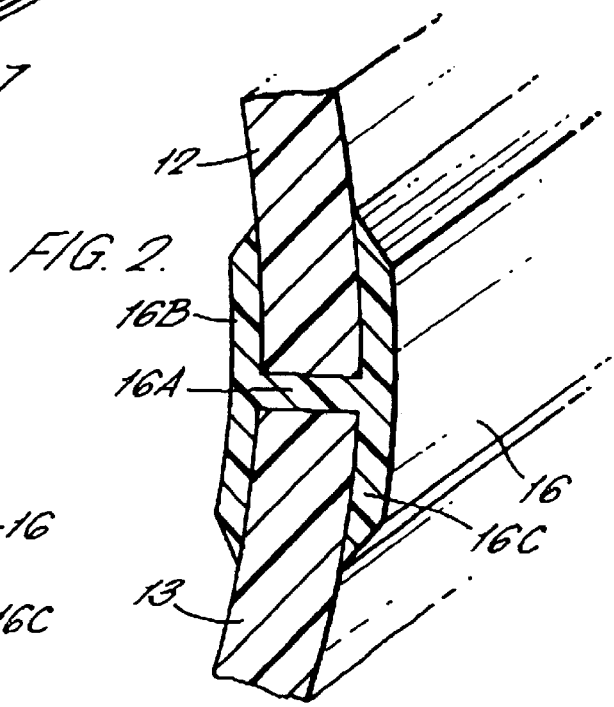
FIG. 2 is a cross-section through the pipe shown in FIG. 1 which illustrates the construction of the pipe.
Figure 3:
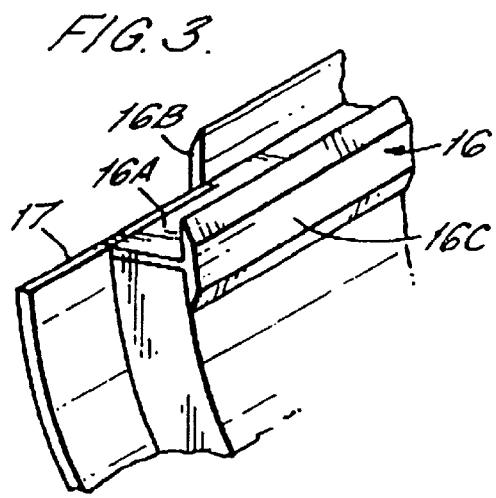
FIG. 3 is a further detailed view showing the construction of the pipe.

FIG. 2 gives a detail which shows how two panels 12 and 13 are joined together by an H-shaped connecting strip 16. The H-shaped connecting strip 16 can be seen to comprise a web 16A which is abutted on one side by a longitudinal edge of the panel 12 and which is abutted on the other side by a longitudinal edge of the panel 13. The web 16A connects two flanges 16B and 16C of the connecting strip 16, each of these flanges 16B and 16C being trapezoidal in shape. Each H-shaped connecting strip provides two grooves in which the longitudinal edges of two different panels can be located.

The longitudinal panels 11, 12, 13, 14, and 15 and the H-shaped connecting strips 16 are all of an equal matched length. Together they define a pipe section of predetermined length.

Each pipe section of predetermined length can be joined at both ends to two further pipe sections to form a pipe. In FIG. 1 there is shown a location joint 17 which extends around the circumference of the formed pipe section 10. From FIG. 4 it can be seen that each panel (e.g. 11) has at its end a recess 18 and it can also be seen that the H-shaped connecting strip 16 which joins the panel 11 to an adjacent panel has a flange 16C which stops short of the end of the connecting strip 11, so that the recess 18 is exposed to the exterior of the connecting strip 11 and is not overlaid by the flange 16C.

Figure 4:
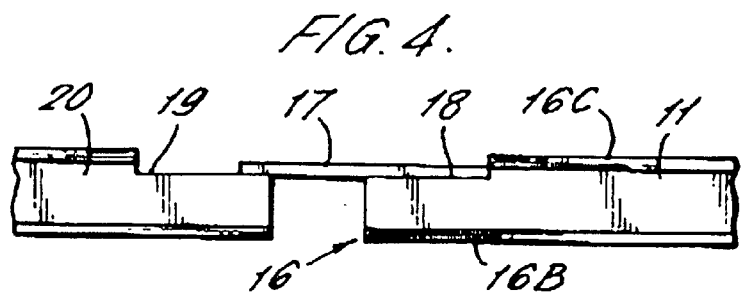
FIG. 4 is a cross-section taken through the detailed view of FIG. 3.

FIG. 4 shows how the location joint 17 locates in the recess 18 defined at the end of the panel 11 and how it can also locate in a recess 19 provided in a panel 20 of a second pipe section. The location joint 17 enables two different pipe sections to be joined together end to end.

In use as a liner in a sewer the provision of the location joint 17 which is totally contained within a rebate formed at the abutting ends of two liner sections is advantageous, so that the location joint does not stand proud of the external diameter of the pipe.

The pipe 10 can be circular in cross-section or can be any other shape required (e.g. the cross-section could be oval, square, rectangular or any other shape). When the pipe 10 is to be used as a liner in a sewer then the cross-section of the pipe 10 will be chosen to match the internal diameter of the sewer.

Typically, each panel will be formed in a glass reinforced plastic by first casting a one piece pipe of a desired cross-section using the centrifugal casting process and then cutting the cast one piece pipe into convenient panels for later assembly using the H-shaped connecting strips 16. The H-shaped strips 16 provide the assembled pipe with structural integrity so that the assembled pipe is self-supporting.

The cutting of the panels from a cast one piece pipe has several advantages. The method can be used to provide various lengths of pipe in whatever number is required quickly and also on demand in response to site difficulties. A one-piece pipe will be cast and then cut into pipe sections of the required length by transverse cuts. Each pipe section can then be machined to provide the end recesses and then cut lengthwise to form panels such as 11, 12, 13, 14, 15. The pipe assembled from the panels has the advantage that it can be made to British Standards with a very dense, void free material engineered to have the required mechanical and chemical properties. The forming of the original one piece pipe can use the centrifugal casting process which is a machine controlled, repeatable process.

It will be appreciated that a damaged H-shaped connecting strip 16 can be replaced easily without disturbing the remaining panels and connecting strips.

The H-shaped connecting strip can be made by several different methods (e.g. extrusion) and of several different materials (e.g. plastic, metal). The choice of material will be a balance between cost and the mechanical properties required (e.g. corrosion resistance). Each connecting strip 16 would typically be cut from a longer length of strip to a required length and then machined to remove sections of flanges at each end to provide for rebates in the ends of the assembled pipe section.

The rotation joint 17 can be formed by transversely cutting a thin-walled one piece pipe of a required diameter.

It is preferred to use adhesive to bond an H-shaped connecting strip 16 to an edge of each panel 11, 12, 13, 14, 15 prior to assembling of a pipe section from the panels because this reduces the number of components to be used and makes jointing simpler for the assembler. Also by bonding the H-shaped connecting strip 16 on one side the number of paths through which liquid may pass is reduced.

When the pipe described above is used to line or reline a sewer then the longitudinal strips are assembled in situ to form a pipe section of the pipe. This enables easy transport of piping to where it is required underground; typically the panels 11, 12, 13, 14, 15 (each with a strip 16 bonded thereto) will be bonded together and then taken to the point of use. The strips and the H-section connecting strips are assembled together to form a pipe section as a liner for the sewer. This is done by connecting panels 14 and 15 together as the base section for the liner at the bottom of the sewer and then building up first one side of the pipe section by connecting the panel 13 to panel 14 and then the other side by connecting the panel 11 to panel 15. The panels 11 and 13 can be slotted tangentially or circumferentially into place. The remaining panel 12 forms a "key" panel for completing the pipe section and panel 12 is slid longitudinally into position between the panels 11 and 13 to complete the pipe section. It will be appreciated that the pipe section is built up panel by panel from the base, with each side built up progressively and equally until a final "key" panel is inserted as the uppermost panel.

Location joints 17 are used to connect different pipe sections together to form the required length of pipe. Preferably when the pipe is used to renovate a sewer then the cross-section of the pipe will be chosen in such a way that timber packing can be used to establish a gap between the external surface of the pipe and the internal surface of the sewer. This allows grout to be inserted between the liner and the sewer, the grout being injected into the defined space, the grout enabling the liner pipe and the sewer to perform structurally as designed. The longitudinal strips can be translucent so that the fabricator of the pipe can visually inspect the grouting process.

Figure 5:
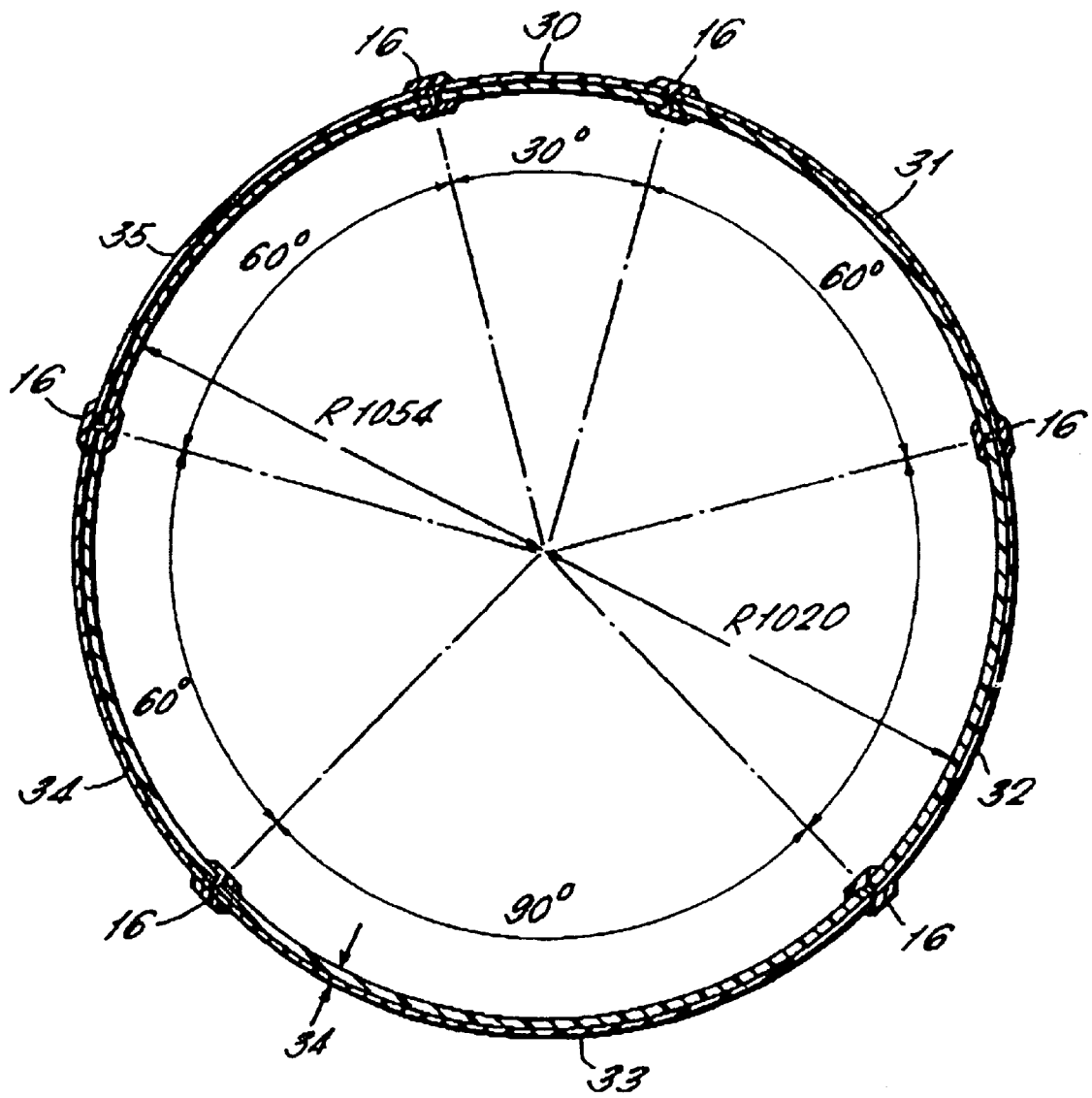
FIG. 5 is a cross-section taken through a second embodiment of assembled pipe.

The different panels 11, 12, 13, 14 and 15 can be of different widths and indeed each different longitudinal strip can have a different radius of curvature. This is illustrated in FIG. 5 where an assembled pipe is shown to comprise six different panels 30, 31, 32, 33, 34 and 35. These panels are each joined to adjacent panels by H-shaped connecting strips 16. The first panel 30 extends round only 30° of the total circumference of the pipe, whereas the panel 31 extends around 60° of the pipe, the panel 32 also extends around 60° of the pipe, the panel 33 extends around 90° of the pipe and the panels 34 and 35 each extend around 60° of the pipes. The panel 33 will be used as the base of the pipe when the pipe is assembled in a sewer and the panel 30 will be the uppermost "key" panel connected last to complete assembly. Whereas the panel 32 has a radius of curvature of 1020 mm, the panel 35 has a radius of curvature of 1054 mm. Thus, it will be appreciated that the illustrated pipe is not exactly circular. The different panels of different radii of curvature can be cut from different one piece pipes of different diameters.

The pipe mentioned above could be used for any purpose, above or below ground, the pipes being far easier to transport in its constituent parts than when assembled. However, the pipe is particularly useful as a liner for a sewer or a tunnel because it enables a liner to be assembled in an existing underground tunnel, an existing underground pipe or sewer in situations where it is impossible to transport a normal pipe for use as a liner.

What is claimed is:

1. A tubular pipe, suitable for lining or re-lining an existing sewer, an existing underground pipe, or an existing underground tunnel, having an arched pipe section which comprises:

three or more panels which extend longitudinally along the arched pipe section, wherein each panel is a panel formed by cutting a one piece pipe lengthwise;

and three or more connecting strips which are integers independent from the three or more panels, the connecting strips extending longitudinally along the arched pipe section and each of which connects two adjacent panels.

2. A pipe as claimed in claim 1 wherein each panel is a panel formed by cutting a one piece pipe lengthwise.

3. A pipe as claimed in claim 1 wherein a first panel has a width different from the width of a second adjacent panel.

4. A pipe as claimed in claim 1 wherein a first panel has a transverse cross-section different from the transverse cross-section of a second adjacent panel.

5. A pipe as claimed in claim 4 wherein the first panel has a curved transverse cross-section with a first radius of curvature and the second panel has a curved transverse cross-section with a second different radius of curvature.

6. A pipe as claimed in claim 2 wherein the pipe section comprises three or more panels joined together by three or more connecting strips.

7. A pipe as claimed in claim 1 wherein the pipe section comprises four or more panels joined together by four or more connecting strips.

8. A pipe as claimed in claim 1 wherein the panels are each formed from glass reinforced plastic.

9. A pipe as claimed in claim 1 wherein each connecting strip is adhered to at least one panel by an adhesive.

10. A pipe as claimed in claim 1 wherein the connecting strips are each formed from glass reinforced plastic.

11. A pipe as claimed in claim 1 wherein the connecting strips are each formed from a plastic.

12. A pipe as claimed in claim 1 wherein the connecting strips are each formed from a metal.

13. A pipe as claimed in claim 1 wherein each connecting strip is H-shaped in transverse cross-section, having two flanges joined by a web, and each connecting strip thereby provides two grooves in which longitudinal edges of two separate panels can be located to join the panels together, one of the flanges overlaying edges of the joined panels inside the pipe and the other of the flanges overlaying edges of the joined panels outside the pipe.

14. A pipe as claimed in claim 1 which is self supporting.

15. A pipe as claimed in claim 1 comprising three or more pipe sections each comprising three or more panels which extend longitudinally along the pipe section and each comprising three or more connecting strips which extend longitudinally along the pipe section and each of which interconnects two adjacent panels.

16. A pipe as claimed in claim 15 wherein adjoining ends of two pipe sections each have recessed portions defined by the shape and configuration of the panels and the connecting strips, which recessed portions together define an annular rebate in the exterior of the pipe, and wherein the two pipe sections are joined by an annular connector which is an integer independent of the two pipe sections and which is dimensioned to be contained completely within the annular rebate.

17. A pipe as claimed in claim 16 wherein the annular connector is an annular member formed by transverse cutting of a one piece pipe.

18. A method of constructing a pipe as claimed in claim 1 comprising:
manufacturing a pipe with a chosen cross-section;
cutting the manufactured pipe lengthwise three or more times to form three or more panels;
manufacturing the connecting strips;
transporting the panels and the connecting strips to a site where the pipe is to be constructed; and
assembling the pipe by connecting the panels together using the connecting strips.

19. A method as claimed in claim 18 wherein the pipe manufactured with the chosen cross-section is a one piece pipe manufactured by the centrifugal casting method.

20. A method of constructing a pipe as claimed in claim 16, comprising:
manufacturing three or more pipe sections each with a chosen cross-section;
cutting each pipe section lengthwise three or more times to form three or more panels;
manufacturing three or more connecting strips;
manufacturing the annular connector;
transporting the panels, the connecting strips and the annular connector to a site where the pipe is to be constructed;
assembling a first pipe section by connecting a first set of the panels together using a first set of the connecting strips;
assembling a second pipe section by connecting a second set of the panels together using a second set of the connecting strips; and
joining the first pipe section to the second pipe section using the annular connector.

21. A method as claimed in claim 20 wherein the pipe sections are manufactured by manufacturing a one piece pipe and then cutting the pipe transversely to form the pipe sections.

22. A method as claimed in claim 20 wherein the annular connector is manufactured by manufacturing a one piece pipe and then cutting the one piece pipe transversely to form the annular connector.

23. A method as claimed in claim 18 wherein an adhesive is used to adhere the strips to the connecting members.

24. A method of lining or re-lining an existing sewer, an existing underground pipe or an existing underground tunnel in which a pipe as claimed in claim 1 is used as a liner and in which the panels and the connecting strips are transported underground to the sewer, the underground pipe or the underground tunnel and then the pipe is assembled as a liner for the sewer by connecting the panels together using the connecting strips to form the assembled pipe.

25. A method of lining or relining an existing sewer, an existing underground pipe or an existing underground tunnel in which a pipe as claimed in claim 14 is used as a liner and in which the panels, the connecting strips and the annular connector are transported underground to the sewer, the pipe or the tunnel and then a first pipe section is assembled by connecting a first set of the panels together using a first set of the connecting strips, a second pipe section is assembled by connecting a second set of the panels together using a second set of the connecting strips and then the first and second pipe sections are joined together using the annular connector to form the assembled pipe.

26. A method as claimed in claim 25 wherein each pipe section is assembled by joining the panels together panel by panel using the connecting strips to first form a base and then sides of the pipe section, thereby forming a slot at the top of the pipe for a final uppermost panel, which final uppermost panel is slid longitudinally into the slot to complete the pipe section.

27. A method as claimed in claim 24 wherein the dimensions of the assembled pipe are chosen to leave a space defined between the assembled pipe and the surrounding sewer, underground pipe or underground sewer and the method includes the step of filling the defined space with grout.

* * * * *